United States Patent Office 3,671,390
Patented June 20, 1972

3,671,390
FAST INITIAL RESPONSE NUCLEAR REACTOR CONTROL SYSTEM
John J. Hogle, Los Gatos, Calif., assignor to General Electric Company
Filed Feb. 14, 1969, Ser. No. 799,275
Int. Cl. G21c 7/32
U.S. Cl. 176—24   6 Claims

ABSTRACT OF THE DISCLOSURE

A control system for boiling moderator-coolant nuclear reactors giving fast response to load changes is disclosed. In this system, the broad operating level of the reactor is set by adjusting the control rods. Then, the reactor operating level is adjusted to follow load requirements by changing the coolant recirculation flow rate. In order to provide fast initial response to rapid load changes an arrangement is provided cooperating with the recirculation flow control to lower the pressure regulator set point when steam demand increases so that reactor internal pressure is temporarily decreased causing increased steam generation due to flashing and sending more steam to the load. A cooperating bypass system is provided to accommodate large sudden decreases in the load steam requirements.

BACKGROUND OF THE INVENTION

Several different types of nuclear power reactors, using the heat energy produced by nuclear fission reactions to perform useful work, have been developed. Reactors of the boiling moderator-coolant type, such as boiling water reactors, have been found to be highly desirable for many applications. A typical reactor of this type includes a chain reacting assembly or core made up of nuclear fuel material contained in fuel elements. Fuel material is encased in a corrosion-resistant heat conductive shell or cladding. The reactor core, made up of a plurality of these elements in spaced relationship, is enclosed in a container through which the reactor moderator-coolant flows. As the coolant passes between the spaced fuel elements, it is heated by the energy given off during the fission reaction which heats and evaporates the coolant. The resulting steam leaves the reactor, is directed to a fluid driven power system such as a single cycle turbine generator system, is condensed and is finally recycled back to the reactor.

In such reactors, the coolant acts both to remove heat from the reactor core and to slow down or moderate fast or fission neutrons released through fission events in the fuel to increase the probability of an occurrence of subsequent fissions and to maintain a chain fission reaction. As boiling occurs within the core, the formation of vapor bubbles in the coolant decreases the amount of liquid moderator in the reactor core, thereby decreasing reactivity. Thus, increased reactivity in the core tends to increase heat generation forming more vapor bubbles. These bubbles, in turn, tend to decrease reactivity. In this manner the reactor is self-regulating. The general reactivity level in such a reactor is set by adjusting the control rods. For example, if the control rods are partially withdrawn, neutron flux level and, therefore, reactively increases. The increased reactivity increases heat generation which causes formation of additional vapor bubbles. As the vapor bubbles form, the moderation effect of the coolant decreases compensating partially for the increased reactivity. Boiling will continue at this level so long as reactor pressure remains constant. However, if pressure is changed substantially during operation without compensatory adjustments being made in the reactor power level, the reactor may not be self-regulating since an increase in pressure tends to inhibit formation of moderator vapor bubbles, permitting power level to increase. Therefore, it is preferable that the reactor internal pressure be maintained substantially constant and that reactivity be controlled by other means. As discussed above, the basic reactor control system consists of the control rods containing neutron absorbing materials which decrease reactivity when inserted. However, the change in the reactor power level and steam output resulting from a change in control rod position is a relatively long-term change generally taking place over a 20–30 second period. Such a delay in the change in steam output is, of course, generally undesirable in practice where considerably faster responses are desired.

Boiling moderator-coolant type reactors have an additional control mechanism available which is not available to other types of reactors. The liquid coolant is pumped from the reactor above the reactor core, and pumped back into the reactor below the core. By varying the flow rate pumped through this recirculation path, the quantity of liquid coolant per unit time passing through the core may be varied. Thus, if an increase in power level is desired, recirculation flow can be increased thereby sweeping vapor bubbles out of the core at a more rapid rate. Since the proportion of the core containing liquid rather than vaporized coolant increases, the moderation effect increases and thus reactivity increases. Where it is desired to decrease the power level of the reactor, recirculation flow may be decreased, thereby sweeping the vapor bubbles out of the core at a lower rate. Since the core will then contain a higher proportion of vapor bubbles and a lower proportion of moderating liquid coolant, reactivity will decrease. Therefore, after the basic reactor operating level desired is set by adjusting the control rods the reactor power level can be varied over a substantial range by varying the coolant recirculation flow rate to follow the load steam requirements.

While the reactor will respond to a change in steam demand from the load more rapidly by adjusting the reactor flow rate than by simply adjusting the control rod positions, there is still a delay of about 5 to 15 seconds before the new power level is reached. Thus, there is a continuing need for an improved boiling water reactor control system which would respond more rapidly to changing load levels.

It has been suggested that the load response time resulting from simply adjusting the control rods could be improved by lowering the reactor pressure temporarily to permit a greater quantity of steam to pass to the load during the period in which the control rods are increasing the reactivity of the core. However, this has been found to be disadvantageous since the decrease in reactor pressure over the 20–30 second period required by the control rod adjustment will temporarily decrease rather than increase the reactor power level. This results from the fact that as the pressure in the reactor drop suddenly, a great many more steam bubbles immediately form in the core because of the lower pressure. This increase in void volume in the core decreases the moderating effect of the coolant substantially, resulting in decreased reactivity. Reactivity is, of course, ultimately increased by the withdrawal of the control rods. However, reactivity is decreased for a significantly period at a time when the load requires additional steam. Then, as reactivity increases due to the withdrawal of control rods, and reactor power level increases, the reactor pressure level is returned to the original setting. This has a tendency to cause a short-term overpower condition, since when the pressure is returned to the original level the pressure within the core temporarily increases to the point where fewer steam bubbles are formed. This increases the moderation effect of the coolant temporarily increasing the reactivity. As reactivity increases more steam bubbles form and the steam output levels off. However, there is likely to be a short-term overpower condition before this self-regulation effect can compensate for the return of the reactor pressure to the standard operating level. Thus, while lowering the reactor pressure temporarily while control rods are being adjusted will temporarily increase the quantity of steam passing to the load, it may result in adverse fluctuations in reactor power level over the period in which the control rods are changing the basic power level.

Also, it is generally undesirable to attempt to use control rod repositioning to follow short-term changes in load steam requirements. The relative positions of the many control rods across the core is at least partially dictated by flux shaping and fuel economy requirements. For optimum over-all reactor performance, different control rods should be moved different distance to obtain a desired reactor power level change. The movement pattern is complex and difficult to maintain where frequent changes must be made to follow short-term load requirements. Further, frequent operation of control drive mechanisms will wear vital parts and increase the change of drive failure. When the reactor operator must frequently move a large number of control rods different distances, the chances of an error increases. An error resulting in an improper rod withdrawal may cause a sudden insertion of reactivity which could damage the reactor or cause an emergency shutdown or "scram."

SUMMARY OF THE INVENTION

It is, therefore, an object of this invention to provide an improved control system for boiling moderator-coolant nuclear reactors having fast initial response to load changes.

Another object of this invention is to provide a reactor control system of improved simplicity and reliability.

Still another object of this invention is to provide a reactor control system capable of rapidly responding to load changes without severe transient power fluctuations.

The above objects, and others, are accomplished in accordance with this invention by providing a boiling moderator-coolant nuclear reactor with a control system which includes control rods to set the general reactor power level, recirculation flow control to vary the power level over a substantial range and a pressure regulator set point control means cooperating with the recirculation flow control to adjust the back pressure on the reactor over a relatively narrow range which can be tolerated by the reactor so that upon a sudden increase in load steam demand the reactor pressure level can be dropped a suitable amount to feed additional steam to the load while the recirculation control is bringing the reactor power up to the required level. This control system also includes means to compensate for a sudden decrease in load steam demand. This system is capable of improving response time from the 4 seconds required for steam flow to being to the increase after an increase in load demand when only recirculation flow control is used to a response of about 1% per second during the first 4 seconds after an increase in load demand where both recirculation flow control and set point adjustment are used. These control means are interrelated so that severe fluctuation in core power level do not occur.

BRIEF DESCRIPTION OF THE DRAWINGS

Details of the invention and of a preferred embodiment thereof will be further understood upon reference to the drawings, wherein.

DETAILED DESCRIPTION OF THE INVENTION

Figure 1:
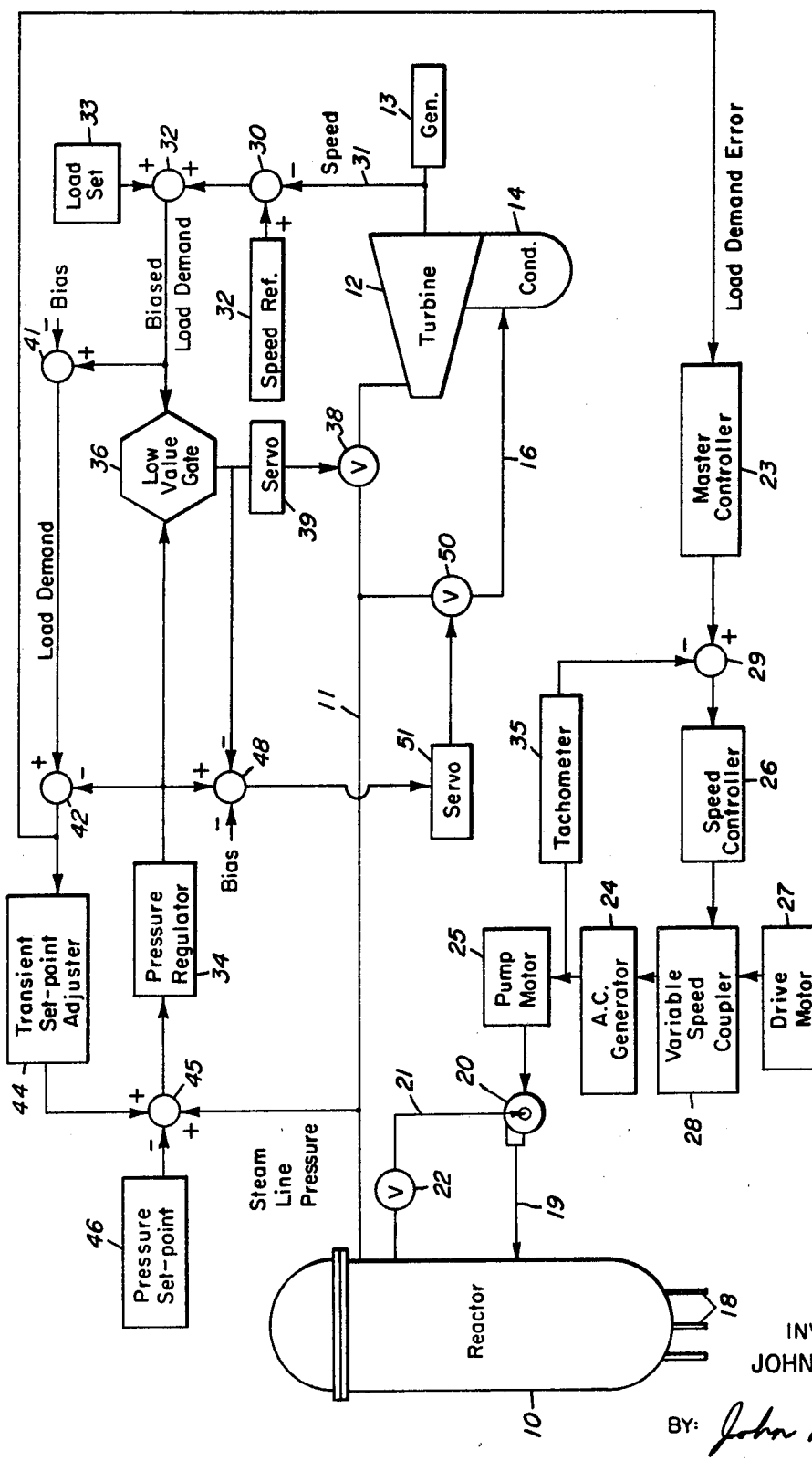
FIG. 1 shows a schematic representation of the reactor control system of this invention.

Referring now to FIG. 1 there is seen a nuclear reactor 10 of the boiling water moderated and cooled type. Steam produced by reactor 10 pass through main steam line 11 to the load, which in this instance is a turbine 12 which drives an electrical generator 13. After passing through turbine 12, the steam is condensed in main condenser 14. A bypass line 16 is provided to divert steam from line 11 directly to main condenser 14 in the event that turbine 12 cannot accept the necessary amount of steam.

The gross power level of the reactor is controlled by control rods, schematically indicated at 18. Reactivity within the reactor core is controlled by the position of control rods 18. As discussed above, a boiling water type reactor has a unique advantage in that power level over a substantial range may be controlled by controlling the rate at which water is recirculated through the core. As seen in FIG. 1, recirculation water leaves the reactor through line 19 and is pumped back into the reactor by a variable speed pump 20 through line 21 and isolation valve 22. As the speed of pump 20 increases, more water is pumped through the reactor core. This more rapid flow tends to sweep steam bubbles out of the core at a more rapid rate. Thus, there is an increase in proportion of moderating water within the core thereby raising the reactivity of the core and the reactor power level.

Recirculation flow is controlled by changing the speed of an A-C generator 24 which supplies the power to the recirculation pump induction motor 25. A speed controller 26 controls the generator speed by varying the fluid coupling between an induction drive motor 27 and the generator 24. The coupling is varied by changing the position of the oil scoop tube in a conventional fluid coupler 28. While only a single recirculation loop and pump drive system is shown in FIG. 1, in general several of these systems will be used in parallel. A master controller 23 receives the load demand error signal and activates each of the recirculation systems. A tachometer 35 measures the speed of the pump and sends a signal to summation point 29. This signal is compared to the signal produced by the master controller. The two signals will cancel out in steady state operations. At summation point 29, the sign on the input indicates the proportional manner in which that signal will affect the output from the summation point. Thus, the signal from the tachometer 35 will tend to inversely affect the signal pass to speed controller 26, while the signal from the master controller will directly affect the signal to the speed controller. In other words, a higher speed signal from the tachometer will tend to lower the speed controller speed while a higher signal from the master controller will tend to increase the speed controller speed. Summation point 29 may consist of any suitable electrical or mechanical device capable of performing the signal comparison function. Thus, a pilot valve arrangement, a lever arrangement, or a conventional electrical circuit may be used. The other summation points discussed below function in a similar manner. While this system is highly effective, it may be desired that an alternative recirculation flow control system (not shown) be used, in which the recirculating coolant is pumped by a large constant speed pump through a throttling valve which is controlled by master controller 23.

While the recirculation flow control system is highly effective in adjusting reactor power level, it has been found to not have as rapid response as would be desired to sudden step load demand changes on the steam flow. The invention herein described utilizes recirculation flow control and in addition adds a system for adjusting the steam line pressure set point on a temporary basis to obtain more rapid response. This system includes means for sensing the speed of generator 13 to detect sudden changes therein or to accept manually introduced rapid load changes and to simultaneously increase the recirculation flow rate and decrease the pressure set point so that reactor pressure is permitted to drop temporarily. This both causes rapid transfer of additional steam to the turbine and, by removing voids from the reactor increases the quantity of moderator in the core and rapidly increases reactivity in the core.

The speed of generator 13 is continuously monitored producing a speed signal which passes to summation point 30 through line 31. Summation point 30 compares the generator speed signal to a speed reference signal 32. A similar comparison of sensed load and load reference signal would be used where the load was other than the turbine generator system shown in this embodiment. Should the generator speed drop below the speed reference signal a signal demanding additional steam to turbine 12 will be passed to summation point 32. Under steady state conditions the generator speed and speed reference signals will cancel out. The load set signal, which may be manually introduced or may result from an automatic controller, is ordinarily set to be larger by about the equivalent of 10% steam flow so that steam flow is normally controlled by pressure regulator 34, as described further below. The signals from load set 33 and summation point 30 are compared at summation point 32 resulting in a biased load demand signal which is passed to low value gate 36. Low value gate 36 also receives a signal from pressure regulator 34. Gate 36 acts in response to the lower of these two signals. When the lower signal changes, gate 36 operates turbine control valve 38 through servo 39.

The biased load demand signal also passes to summation point 41 where a bias equal to the 10% bias introduced in load set 33 is subtracted so that the output from summation point 41 is the true load demand. The true load demand signal passes to summation point 42 where it is compared to the signal from pressure regulator 34. During steady state operation these signals will cancel out. However, if there is a difference in the load demand and the pressure regulator signals, summation point 42 will produce an output signal which is the load demand error signal. The load demand error signal will pass to master controller 23 so that recirculation flow can be adjusted to correct the error, as described above. The load demand error signal also passes to transient set point adjuster 44.

Summation point 45 compares the actual steam like pressure from line 11, the manually set pressure set point 46 and the signal from transient set point adjuster 44. Where there is a rapid increase in load demand, the transient set point adjuster signal will be such as to change the pressure regulator appreciably to permit a greater quantity of steam to pass to turbine 12.

The signal from pressure regulator 34 also passes to summation point 48 where it is compared to the output signal of low value gate 36. The small bias (generally equivalent to about 1 p.s.i.) is introduced into summation point 48 to keep the bypass valve closed, since the other two signals ordinarily cancel each other. Should the pressure regulator signal rise substantially above the signal from low value gate 36 and exceed this bias, as would occur if the biased load demand took control of low value gate 36, the output signal from summation point 48 will operate bypass valve 50 through servo 51. This will cause steam to bypass turbine 12 and pass directly to main condenser 14. The reactor steaming rate can keep up with normal load maneuvering, so that bypassing of steam is not normally required. This occurs when the load demand drops at a rate faster than the system can accommodate, and greater than the 10% bias in the load demand signal.

OPERATION

Under steady state operating conditions, the speed signal and the speed reference signal 32 will balance at summation point 30, thus no signal will pass from summation point 30 to summation point 32. The biased load demand will then be the load set 33, including the built in bias. This signal will pass to low value gate 36. Meanwhile, the biased load demand will have the bias removed at summation point 41 and the load demand signal will pass to summation point 42. Under these steady state conditions, the pressure regulator 34 will have control over the turbine steam flow. The signal from pressure regulator 34 entering summation point 42 will balance the load demand. Thus, there will be no output signal from summation point 42 to transient set point adjuster 44 or master controller 23. Thus, recirculation flow speed will remain constant. Low value gate 36 will control valve 38 through servo 39 in response to the signal from pressure regulator 34. Summation point 48, receiving input signals from pressure regulator 34 and low value gate 36 will be balanced within the limits imposed by the small bias. Thus, bypass valve 50 will remain closed.

The improved control system of this invention will come into play when there is a rapid change in load demand. Assuming an emergency or change in electrical demand which causes generator 13 to slow down an amount equivalent to about a 10% load step demand. The speed signal 31 will drop to a level below that of speed reference 32. Since the output of summation point 30 is inversely proportional to speed signal 31 (as indicated by the negative sign adjacent the speed signal input arrow) this will increase the signal pass to summation point 32. Thus, the biased load demand will increase since the output of summation point 32 is directly proportional to the input from summation point 30. Thus, the signal reaching low value gate 36 from the summation point 32 will be increased. This will have no immediate affect since low value gate operates according to the lower of the two received signals. Meanwhile, an increased signal will reach summation point 41 where the built in bias is removed. The true load demand will thus increase proportionally. The output signal from summation point 42 will again increase proportionally since the load demand input will exceed the input from pressure regulator 34. A load demand error signal from summation point 42 will pass to master controller 23 causing an increase in the recirculation flow rate. This load demand error signal will also pass through the transient set point adjuster 44 to summation point 45. A proportionately increasing output signal from summation point 45 will increase the signal from pressure regulator 44 to low value gate 36. Since both input signals to low value gate 36 have increased, the gate will open control valve 38 through servo 39 in response to the pressure regulator signal which is still the lower of the two input signals. Thus, a rapid increase in steam flow from reactor 10 to turbine 12 will occur. This initial higher steam flow rate due to the adjustment of the pressure set point will cause an increase in the turbine speed. The output signal from summation point 42 will decrease, as the pressure regulator signal increases, until it reaches zero at which time the load demand is satisfied and the transient set point adjuster signal is also zero. Thus, after a few seconds the pressure set point will return to the original value. This is important since if the reactor pressure were to remain low for an appreciable period then adverse affect on steam output would occur since at the lower pressure more voids could form in the core resulting in a lower proportion of moderator in the core and thus a lower core heat output. However, with the system of the present invention the reactor pressure is decreased for only a short period, long enough to rapidly pick up the load demand change.

As turbine 12 rapidly receives the needed additional steam, the speed of generator 13 increases, increasing the speed signal to summation point 30. Because of speed regulation (a proportional type speed governor) the speed signal 31 will not quite match the speed reference signal at point 32, since the output signal from summation point 30 must supply the load demand signal necessary to keep control valve 38 open the required amount. Of course, the load set 33 can be increased this same amount so that the speed signal can match the speed reference signal, if desired. In either case, the system thus reaches a new steady state condition with a higher recirculation flow and steaming rate to supply the greater steam requirements of the turbine.

Where the speed of generator 13 increases suddenly much the reverse of what was described above with respect to a sudden increase in load occurs. As speed signal 31 increases the output of summation point 30 will inversely decrease. Thus, the biased load demand signal from summation point 32 will be decreased. Low value gate 36 will compare this signal to that from pressure regulator 34. If biased load demand is lower than the pressure regulator signal, as would be the case where the biased load demand signal decreases suddenly by more than 10%, then low value gate 36 will respond to the biased load demand and begin to close control valve 38. Meanwhile, the biased load demand passes through summation point 41 where the bias is removed and reaches summation point 42 as the true load demand signal. Since this signal will be lower than the signal from the pressure regulator, the output signal from summation point 42 will be lower. This load demand error signal will reach master controller 23 to cause a decrease in recirculation flow. This signal will also reach summation point 45 through transient set point adjuster 44. The output signal from summation point 45 will be lower thereby lowering the signal from pressure regulator 34 to the low value gate 36. This signal from pressure regulator 34 will be compared at summation point 48 to the signal from low value gate 36. If the difference in these signals exceeds the small bias, the output signal from summation point 48 will open bypass valve 50 by means of servo 51. This will permit dumping of steam to main condenser 14 to prevent an undesired increase in reactor pressure. Whether or not it is necessary to bypass steam to the main condenser, as the system decreases steam flow to turbine 12, the speed signal will return to normal and the system will return to steady state open operation, at a lower recirculation flow rate.

The comparative response rates of various reactor operating parameters to sudden step load demand changes with the recirculation flow control system of the prior art and with the control system of the present invention are graphically shown in FIGS. 2 through 5.

Figure 2:
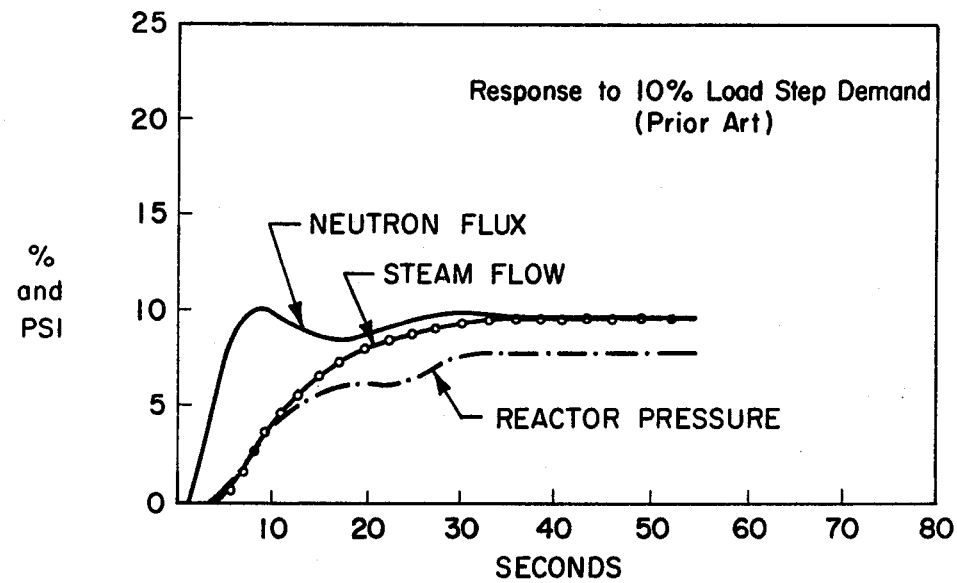
FIG. 2 shows the response characteristics of a prior art control system to a 10% load step demand.
Figure 3:
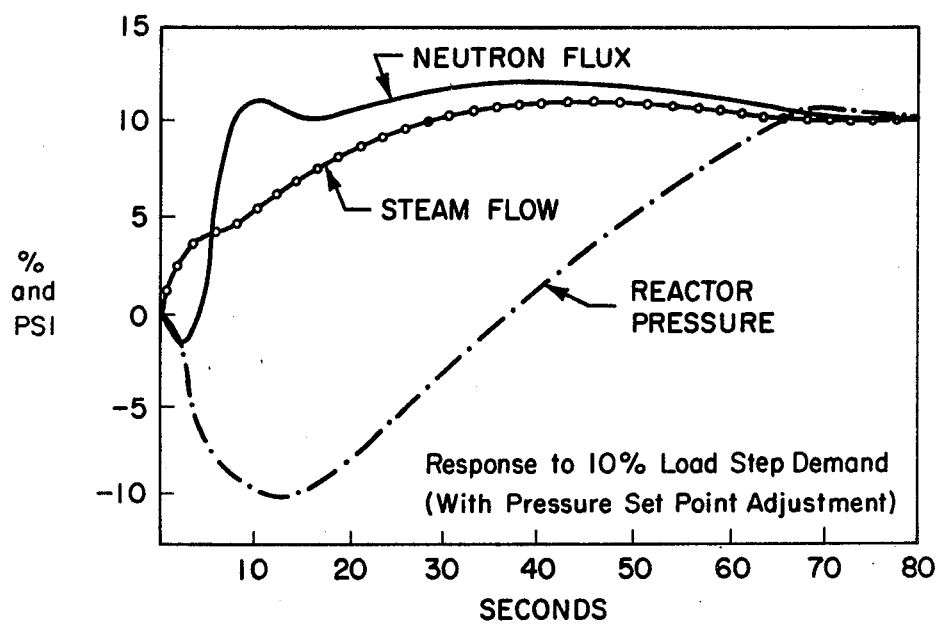
FIG. 3 shows the response characteristics of the control system of this invention to a 10% step demand.

FIGS. 2 and 3 show the change in neutron flux, steam flow and reactor pressure with time in response to a 10% load step demand. As can be seen in FIG. 2, the prior art system required about 3 seconds before any observable change in steam flow occurred. With the control system of this invention, as seen in FIG. 3, the increase in steam flow is very rapid, with about a 3% increase after only about 2 seconds. The full 10% increase in steam flow is achieved in only about 30 seconds with the system of this invention while the prior system required about 37 seconds. This much more rapid steam flow response results from the transient set-point adjustment which permits reactor pressure to drop drastically during the first few seconds after the increase in demand. As was discussed above, the sudden lowering in reactor pressure will for a few seconds increase the portion of steam bubbles in the core. This results in a drop in neutron flux for about 4 seconds. However, the neutron flux level recovers rapidly and reaches the 10% increase level after about 8 seconds with both the prior art and present control systems.

Figure 4:
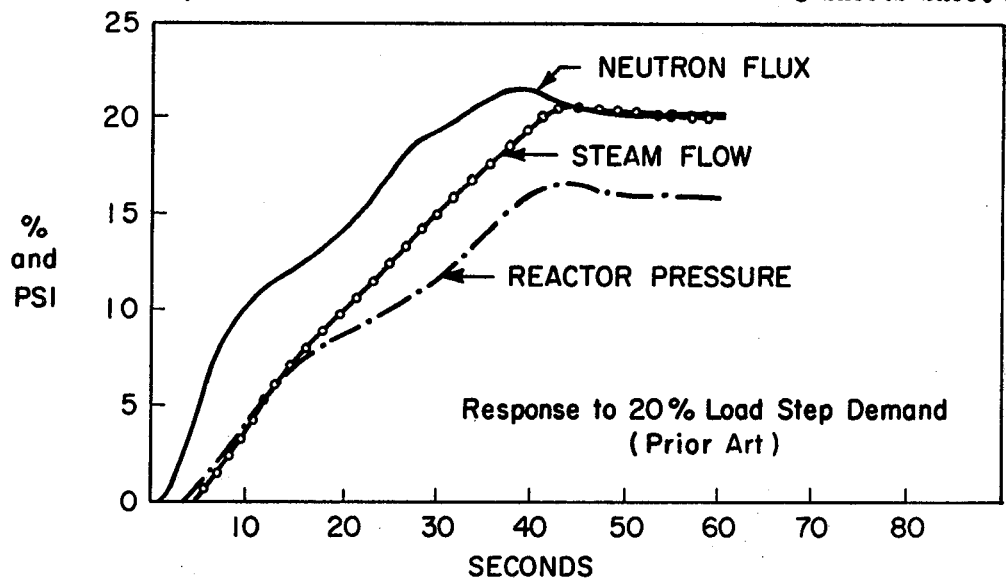
FIG. 4 shows the response characteristics of a prior art control system to a 20% load step demand.
Figure 5:
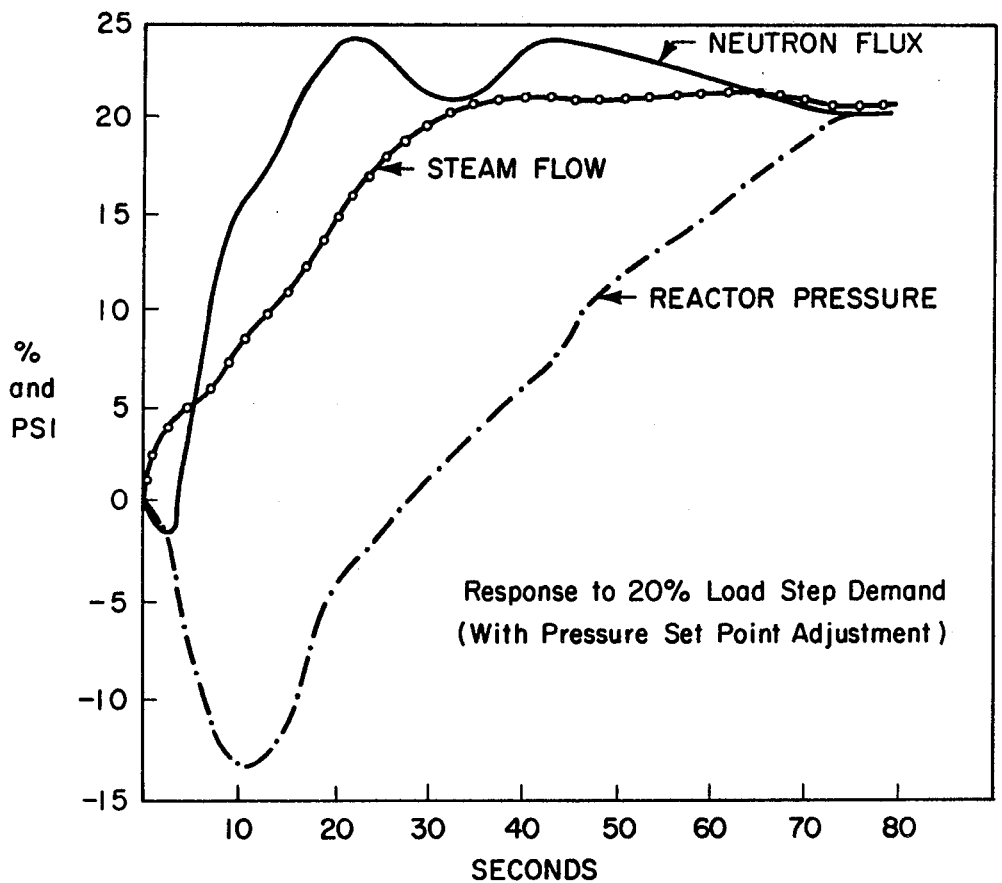
FIG. 5 shows the response characteristics of the control system of this invention to a 20% load step demand.

FIGS. 4 and 5 show a similar set of curves where there has been a 20% load step demand increase. Again, it is clear that the system of this invention provides much more rapid increase in steam flow in response to the demand increase. Again, the neutron flux level is depressed for a few seconds but quickly regains the desired level.

Thus, it can be seen that the control system of this invention permits much more rapid response to sudden changes in load demands with no decrease in safety or reliability.

Although specific arrangements and proportions have been described in the above description of a preferred embodiment, other suitable arrangements and components may be used as indicated above with similar results.

Other modifications and ramifications of the present invention will occur to those skilled in the art upon reading the present disclosure. These are intended to be included within the scope of this invention.

I claim:

1. A control system for a power system including a water cooled steam generating nuclear reactor supplying steam to a variable load; coolant recirculation means including pump means to recirculate said water coolant through the core of said reactor; and valve control means for controlling the rate of steam flow from said reactor to said load; said valve control means comprising first means responsive to variations in said load, producing a load demand signal; pressure regulating means responsive to the pressure in said reactor and to the set base pressure for said reactor; said coolant recirculation means operatively connected to said first means to vary recirculation flow rate in accordance with variation in said load demand signal; valve operating means operatively connecting said first means and said pressure regulating means to operate said valve means to vary the rate of steam flow from said reactor to said load in accordance with the lower of the signals from said first means and said pressure regulating means; and transient pressure set-point adjusting means responsive to said first means adapted to lower the set-point of said pressure regulating means whereby the reactor pressure is temporarily decreased below the normal pressure set-point in response to sudden increases in load demand.

2. The control system according to claim 1 further including bypass means responsive to said valve operating means and to said pressure regulating means to divert steam flow from said load in the event reactor steam output rate rises significantly above the rate at which said load can accept steam.

3. The control system according to claim 1 wherein said coolant recirculation means includes a master controller responsive to said load variations, and at least one variable pumping system responsive to said master controller, said pumping system including a speed controller responsive to said master controller and to a tachometer sensing recirculation pump speed, a variable speed coupler actuatable by said speed controller, a constant speed motor connected in driving relationship with said variable speed coupler, an alternating current generator connected in driven relationship with said variable speed coupler, a pump drive motor adapted to be powdered by the output from said alternating current generator and a pump connected in driven relationship with said pump drive motor, said pump hydraulically connected to said reactor to receive coolant from said reactor and recirculate it through the reactor core.

4. The control system according to claim 1 wherein said first means includes sensing means for sensing variations in load; first summation means comparing load variations with a load reference; and second summation means for comparing the comparative signal from said first summation means with a load set signal and producing a load demand signal.

5. The control system according to claim 1 wherein said pressure regulating means includes a pressure summation means comparing signals from means sensing steam pressure in said reactor, a pressure set point signal and a transient pressure set-point adjusting means which is adapted to lower the reactor set-point when said load demand signal significantly exceeds the output signal from said pressure summation means.

6. In a control system for a nuclear power plant which comprises a liquid cooled steam generating nuclear reactor supplying steam to a variable load, means varying coolant flow through said reactor in accordance with variations in said load, and valve means varying the flow of steam to said load in response to said load variation while maintaining the pressure in said reactor above a base set-point; the improvement comprising transient set-point adjustment system responsive to variations in said load whereby the reactor pressure may be temporarily decreased below the base set-point in response to sudden significant increases in said load to permit initially greater steam flow to said load; said transient set-point adjustment system including a first sensing means for sensing variations in load; first summation means comparing load variations with a load reference signal; second summation means for comparing the signal from the first summation means with a load set signal and producing a load demand signal; transient set-point adjustment means to lower the reactor pressure set-point in response to a sudden increase in said load demand signal and valve means responsive to said reactor pressure set-point whereby additional steam is admitted to said load in response to said sudden increase in said load demand signal.

References Cited
UNITED STATES PATENTS

| | | | |
|---|---|---|---|
| 3,128,233 | 4/1964 | Kuerzel | 176—24 |
| 3,275,524 | 9/1966 | Williams | 176—20 |
| 3,284,312 | 11/1966 | West | 176—20 |

REUBEN EPSTEIN, Primary Examiner

U.S. Cl. X.R.

176—20